United States Patent [19]

Weingarten

[11] 4,181,548
[45] Jan. 1, 1980

[54] LAMINATED PLASTIC PACKAGING MATERIAL

[76] Inventor: Joseph L. Weingarten, 1927 Oak Tree Dr., Kettering, Ohio 45440

[21] Appl. No.: 941,716

[22] Filed: Sep. 12, 1978

Related U.S. Application Data

[62] Division of Ser. No. 884,056, Mar. 6, 1978.

[51] Int. Cl.$^2$ .......................... B32B 3/12; B32B 1/00
[52] U.S. Cl. .................... 156/145; 156/272; 156/281; 156/292; 156/322; 5/420; 5/455; 428/166; 428/172; 428/178; 29/91.1
[58] Field of Search .......... 156/145, 272, 229, 556, 156/292, 301, 322; 428/166, 158, 159, 178, 180, 35, 172; 5/368

[56] References Cited

U.S. PATENT DOCUMENTS

| 3,142,599 | 7/1964 | Chavannes | 428/178 |
| 3,392,081 | 7/1968 | Chavannes | 428/178 |
| 3,817,803 | 6/1974 | Horsky | 428/178 |

*Primary Examiner*—George F. Lesmes
*Assistant Examiner*—P. Thibodeau
*Attorney, Agent, or Firm*—Joseph E. Rusz; Richard J. Killoren

[57] ABSTRACT

A three layer laminated plastic cushioning material having a substantially flat central layer with sealed air pockets formed on both sides of the central layer between the central layer and layers positioned on opposite sides of the central layer.

1 Claim, 5 Drawing Figures

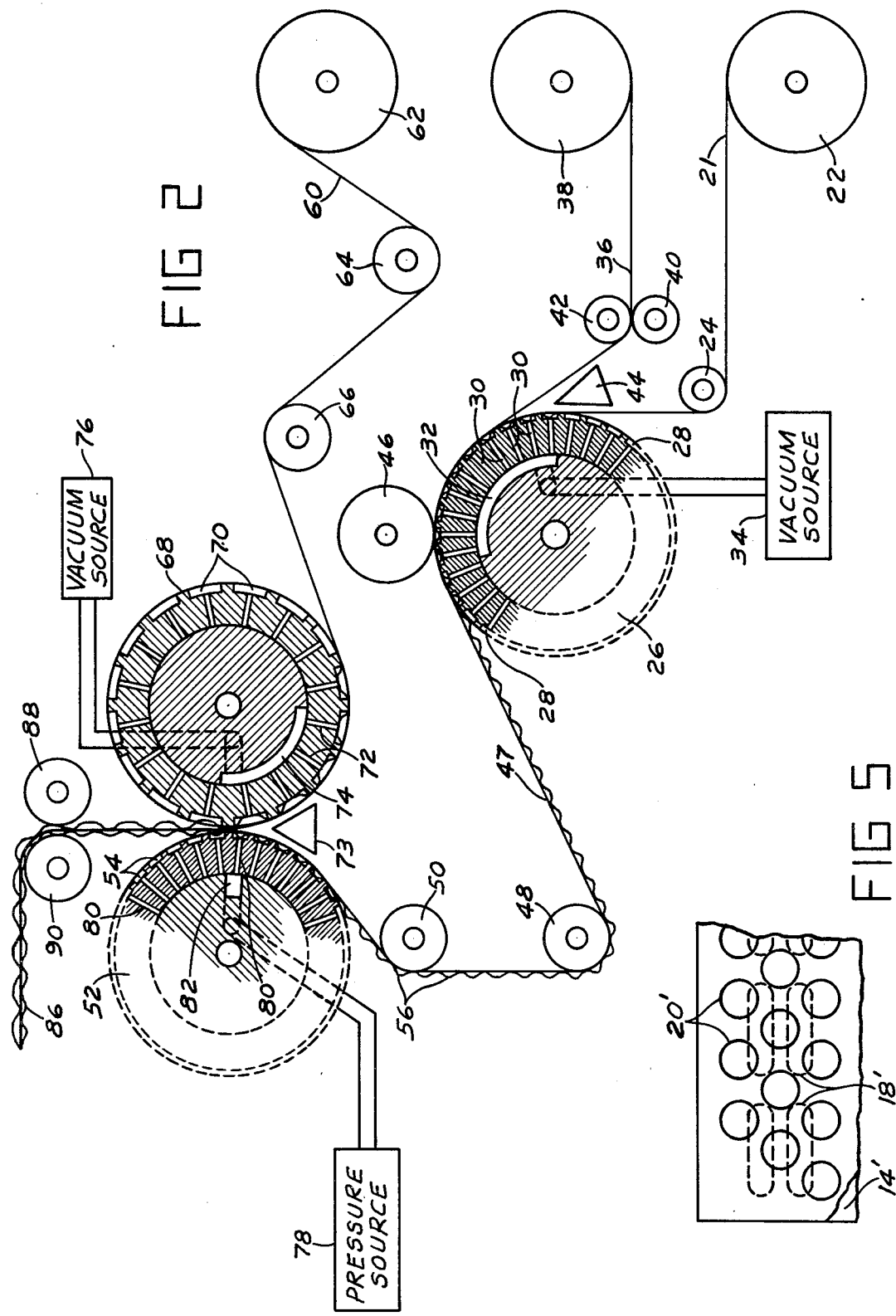

LAMINATED PLASTIC PACKAGING MATERIAL

This is a division of application Ser. No. 884,056 filed Mar. 6, 1978.

BACKGROUND OF THE INVENTION

This invention relates to a laminated plastic cushioning material for use in the packaging of products.

Laminated plastic cushioning materials with sealed pockets of air have been constructed in various configurations as shown in the patent to Chavairnes, U.S. Pat. No. 3,142,599. Three and more layers of plastic have been used in some configurations.

BRIEF SUMMARY OF THE INVENTION

According to this invention, a laminated plastic cushioning material with three layers of plastic wherein sealed air pockets are provided on opposite sides of a substantially flat central layer. This will substantially double the volume of cushioning material with only one additional layer of plastic. However, if the air pockets are the same size, the problem of nesting between adjacent layers will occur thus reducing the effective increase in volume of the cushioning material. When the material on opposite sides of the central flat layer are made with different size pockets, the problem of nesting is substantially eliminated.

IN THE DRAWINGS

FIG. 2 shows a schematic diagram of one apparatus for constructing the material of FIG. 1.

FIG. 5 shows another embodiment of the invention.

Figure 1:
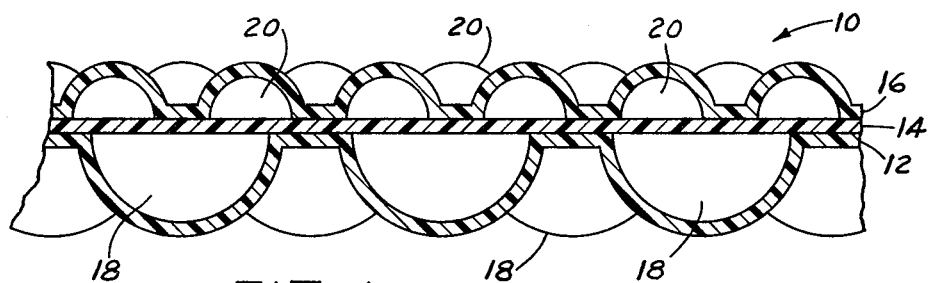
FIG. 1 is a section view of a laminated plastic cushioning material according to the invention.

Reference is now made to FIG. 1 of the drawing which shows a section of plastic cushioning material 10 having three layers 12, 14 and 16 of plastic material such as polyethylene, polypropylene or other thin plastic film. The layers 12 and 16 are shaped to form air pockets 18 and 20 of different sizes on opposite sides of substantially flat layer 14.

The layers can be formed and bonded by conventional construction systems.

For example a layer 21 of plastic from supply roller 22 passes over a heated guide roller 24 to soften the plastic before application to forming roller 26. The softened layer is drawn into the recesses 28 in roller 26 by means of a vacuum supplied to recesses 28 through passages 30 and 32 from vacuum source 34. A second layer 36 of plastic from supply roller 38 passes over heated guide roller 40 and around a guide roller 42 onto the layer 21 from roller 22. The surface of the films are brought to a fusing temperature by heater 44 and the two layers then pass between roller 26 and a heated pressure roller 46. The laminated material 47 thus formed is the same as conventional laminated cushioning material known in the art.

The material after leaving roller 26 is then passed over guide roller 48 and a heated guide roller 50. A pressure roller 52 having recesses 54 is positioned to receive gas filled pockets 56.

A third layer 60 of plastic from supply roller 62 passes around guide roller 64 and over a heated guide roller 66 to soften the plastic before application to forming roller 68 having recesses 70. The plastic layer 60 is drawn into the recesses 70 by means of a vacuum supplied to recesses 70 through passages 72 and 74 from vacuum source 76. The materials 47 and 60 pass heater 73 to bring the surfaces to a fusing temperature. A pressure from source 78 is supplied to recesses 54 through passages 80 and 82. The pressure supplied from source 78 should be substantially equal to the pressure of the roller 52. For example if the pressure of roller 52 against roller 68 is equal to 30 psi, then a pressure of 30 psi should be supplied from pressure source 78 to provide a substantially uniform pressure between rollers 52 and 68.

The finished material 86 then passes between guide rollers 88 and 90. Rollers 48, 88 and 90 will act to strip the material from rollers 26 and 68; however, separate stripping rollers, not shown, may be provided adjacent rollers 26 and 68 where needed.

Figure 3:
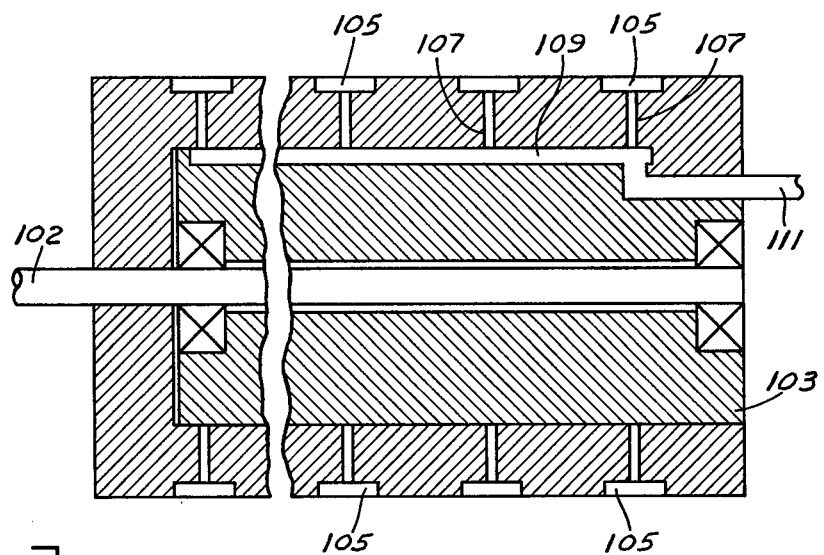
FIG. 3 is a schematic sectional view of one roller assembly for use in the device of FIG. 2.
Figure 4:
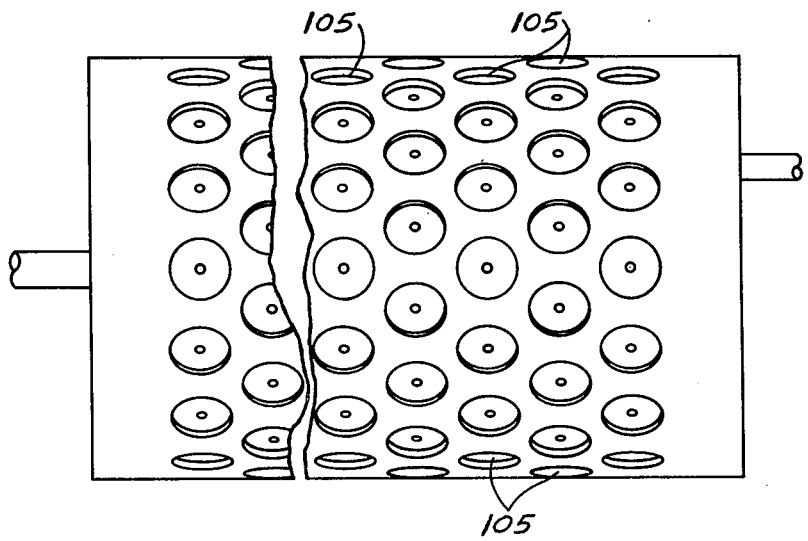
FIG. 4 shows one configuration for the recesses on the device of FIG. 3.

The rollers 26, 52 and 68 may have a configuration as shown in FIGS. 3 and 4. The rollers have a rotary member 101 on shaft 102 and a stationary member 103 as shown in FIG. 3. Recesses 105 may be positioned on the portion 101 in an arrangement such as shown in FIG. 4. Passages 107 connect the recesses 105 with a passage 109 in stationary member 103. A supply line 111 supplies pressure or vacuum to passage 109.

While recesses 105 are shown as circular, they could have other shapes, for example the recesses could be elongated to provide elongated air pockets as shown at 18' in FIG. 5. Also the air pocket on opposite sides of the layer 14' need not have the same shape as shown at 18' and 20' in FIG. 5.

There is thus provided a laminated plastic cushioning material which supplies an increased volume over other three layer cushioning material and wherein the nesting problem is substantially eliminated.

I claim:

1. In a method for the continuous fabrication of laminated cushioning material including the steps of heating a first layer of thermoplastic material above the softening temperature of the thermoplastic; passing the softened material over a first forming roller including a plurality of depressions in the outer surface; supplying a vacuum to the depressions to draw portions of the softened thermoplastic layer into the depressions; passing a second layer of thermoplastic over the roller in contact with the first layer to form air pockets between the first layer and second layer; heating the first layer and second layer to a fusing temperature prior to application of the second layer; passing the first and second layer past a heated pressure roller adjacent the first roller; removing the fused layer from the first roller; forming a plurality of air pockets on the side of said first layer remote from said second layer with the additional steps comprising: heating a third layer of thermoplastic material above the softening temperature of the thermoplastic; passing the softened material over a second forming roller including a plurality of depressions in the outer surface; supplying a vacuum to the depressions to draw portions of the softened thermoplastic layer into the depressions; passing the fused layers and the third layer between a second pressure roller and the second forming roller; said second pressure roller including a plurality of depressions adapted to receive the air pockets on said fused layers; supplying a pressure to the depressions of the second roller adjacent the second forming roller to supply a pressure to the fused layer equal to the pressure between the second pressure roller and the second forming roller; heating the fused layer and the third layer to a fusing temperature prior to passing between the second pressure roller and the second forming roller; removing the three fused layers from the second forming roller.

* * * * *